United States Patent
Sinha et al.

(10) Patent No.: US 9,501,531 B2
(45) Date of Patent: Nov. 22, 2016

(54) CONTEXTUAL RELEVANCE ENGINE FOR ACTIVITY FEEDS

(75) Inventors: Avijit Sinha, Newcastle, WA (US); Evan Stavrou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 13/110,277

(22) Filed: May 18, 2011

(65) Prior Publication Data
US 2012/0296919 A1   Nov. 22, 2012

(51) Int. Cl.
*G06F 17/30* (2006.01)
*G06Q 50/00* (2012.01)
*H04L 29/08* (2006.01)

(52) U.S. Cl.
CPC ... *G06F 17/30516* (2013.01); *G06F 17/30867* (2013.01); *G06Q 50/01* (2013.01); *H04L 67/22* (2013.01)

(58) Field of Classification Search
CPC ................................. G06F 17/30; G06F 17/00
See application file for complete search history.

(56) References Cited

U.S. PATENT DOCUMENTS

| | | | |
|---|---|---|---|
| 6,256,633 B1 * | 7/2001 | Dharap | G06F 17/30867 |
| 6,845,374 B1 * | 1/2005 | Oliver | G06F 17/30675 |
| 7,139,757 B1 * | 11/2006 | Apollonsky | G06F 17/30722 |
| 7,269,627 B2 * | 9/2007 | Knauerhase | 709/206 |
| 7,570,943 B2 * | 8/2009 | Sorvari et al. | 455/414.1 |
| 7,669,123 B2 | 2/2010 | Zuckerberg | |
| 7,707,040 B2 * | 4/2010 | Lakhotia et al. | 705/1.1 |
| 7,716,225 B1 * | 5/2010 | Dean et al. | 707/748 |
| 7,769,740 B2 | 8/2010 | Martinez | |
| 7,836,056 B2 * | 11/2010 | Meijer et al. | 707/741 |
| 7,836,151 B2 * | 11/2010 | Bellotti et al. | 709/218 |
| 7,882,111 B2 * | 2/2011 | Chien | G06F 17/30873 707/749 |
| 7,908,287 B1 * | 3/2011 | Katragadda | 707/767 |
| 7,927,559 B2 * | 4/2011 | Bodlaender et al. | 422/401 |
| 7,987,170 B2 * | 7/2011 | Hirst | 707/706 |
| 8,015,189 B2 * | 9/2011 | Naaman | 707/740 |

(Continued)

OTHER PUBLICATIONS

Katakis, Ioannis, Grigorios Tsoumakas, Evangelos Banos, Nick Bassiliades, and Ioannis Vlahavas. "An adaptive personalized news dissemination system." Journal of Intelligent Information Systems 32, No. 2 (2009): 191-212.*

(Continued)

*Primary Examiner* — Farhan Syed
(74) *Attorney, Agent, or Firm* — Tom Wong; Jessica M. Meyers; Micky Minhas

(57) ABSTRACT

A method for determining relevance for activity feeds is disclosed. Activity feeds are received from one or more business entities. Information is received regarding activities being performed by a user. Context information is received regarding the user. A user context is determined from the information the regarding activities being performed by the user and the context information. The user context indicates the current status of the user. A relevance of the activity feeds is determined based on the user context. At least some of the activity feeds are displayed on a computing device. The at least some of the activity feeds are displayed according to a priority determined by the relevance.

20 Claims, 6 Drawing Sheets

(56) References Cited

U.S. PATENT DOCUMENTS

| | | | | |
|---|---|---|---|---|
| 8,032,390 B2* | 10/2011 | Waguet | ............................ | 705/1.1 |
| 8,096,811 B2* | 1/2012 | Sumner et al. | ................ | 434/262 |
| 8,099,661 B2* | 1/2012 | Ritter | ............................ | 715/224 |
| 8,117,207 B2* | 2/2012 | Mushtaq | ................ | G06F 17/30 |
| | | | | 705/1.1 |
| 8,266,231 B1* | 9/2012 | Golovin et al. | ............... | 709/206 |
| 8,571,910 B2* | 10/2013 | Lyras | ...................... | G06F 17/30 |
| | | | | 705/7.11 |
| 8,600,981 B1* | 12/2013 | Chau | ................. | G06F 17/30867 |
| | | | | 707/723 |
| 8,631,030 B1* | 1/2014 | Bhattacharjee | ... | G06F 17/30973 |
| | | | | 707/722 |
| 8,645,395 B2* | 2/2014 | Mushtaq | ................. | G06F 17/30 |
| | | | | 705/1.1 |
| 8,756,228 B2* | 6/2014 | Pitkow | ............... | G06F 17/30867 |
| | | | | 705/26.3 |
| 8,886,766 B2* | 11/2014 | Dunn | ..................... | G06Q 10/10 |
| | | | | 709/219 |
| 2002/0052919 A1* | 5/2002 | Morris et al. | .................. | 709/205 |
| 2004/0043758 A1* | 3/2004 | Sorvari et al. | ............. | 455/414.1 |
| 2005/0060365 A1 | 3/2005 | Robinson | | |
| 2008/0126388 A1* | 5/2008 | Naaman | ......................... | 707/102 |
| 2008/0288573 A1* | 11/2008 | Bellotti et al. | ................ | 709/201 |
| 2009/0083251 A1* | 3/2009 | Sahasrabudhe | ........ | G06Q 40/06 |
| 2009/0144369 A1 | 6/2009 | Brown | | |
| 2009/0193014 A1 | 7/2009 | Menezes | | |
| 2009/0265332 A1* | 10/2009 | Mushtaq | ................. | G06F 17/30 |
| 2010/0063969 A1* | 3/2010 | Kasargod et al. | ............ | 707/740 |
| 2010/0114946 A1* | 5/2010 | Kumar | ................ | G06F 17/30035 |
| | | | | 707/770 |
| 2010/0131455 A1* | 5/2010 | Logan | ................ | G06F 17/30905 |
| | | | | 707/602 |
| 2010/0138416 A1* | 6/2010 | Bellotti | ............. | G06F 17/30056 |
| | | | | 707/736 |
| 2010/0138452 A1* | 6/2010 | Henkin | ............... | G06Q 30/0256 |
| | | | | 707/803 |
| 2011/0004831 A1* | 1/2011 | Steinberg | ............. | H04N 21/454 |
| | | | | 715/753 |
| 2011/0137940 A1* | 6/2011 | Gradin | ............... | G06F 17/30867 |
| | | | | 707/769 |
| 2011/0209069 A1* | 8/2011 | Mohler | ........................ | 715/744 |
| 2011/0213655 A1* | 9/2011 | Henkin | ................... | G06Q 30/00 |
| | | | | 705/14.49 |
| 2012/0101985 A1* | 4/2012 | Kemp | ................. | G06F 17/3051 |
| | | | | 707/609 |
| 2012/0102063 A1* | 4/2012 | Kemp | ................. | G06F 17/3051 |
| | | | | 707/769 |
| 2012/0102114 A1* | 4/2012 | Dunn | ..................... | G06Q 10/10 |
| | | | | 709/204 |
| 2012/0102153 A1* | 4/2012 | Kemp | ................. | G06F 17/3051 |
| | | | | 709/219 |
| 2012/0102420 A1* | 4/2012 | Fukahori | .............. | G06Q 10/107 |
| | | | | 715/771 |
| 2012/0143597 A1* | 6/2012 | Mushtaq | ................. | G06F 17/30 |
| | | | | 704/9 |
| 2013/0080207 A1* | 3/2013 | Lyras | ..................... | G06F 17/30 |
| | | | | 705/7.28 |
| 2014/0019198 A1* | 1/2014 | Lyras | ..................... | G06F 17/30 |
| | | | | 705/7.28 |
| 2014/0032482 A1* | 1/2014 | Dulaney | ............ | G06F 17/2229 |
| | | | | 707/607 |
| 2014/0033046 A1* | 1/2014 | Walsh | ................ | G06F 17/2229 |
| | | | | 715/730 |
| 2014/0129678 A1* | 5/2014 | Herman | ................. | H04L 67/26 |
| | | | | 709/217 |

OTHER PUBLICATIONS

Gelernter, Judith, Dong Cao, and Jaime Carbonell. "Studies on relevance, ranking and results display." arXiv preprint arXiv:1006. 4535 (2010).*

Zhang, Xiangmin. "Collaborative relevance judgment: A group consensus method for evaluating user search performance." Journal of the American Society for Information Science and Technology 53, No. 3 (2002): 220-231.*

Abel et al.; "Linkage, Aggregation, Alignment and Enrichment of Public User Profiles with Mypes" *I-Semantics*, 2010, 8 pages.

* cited by examiner

FIG. 3

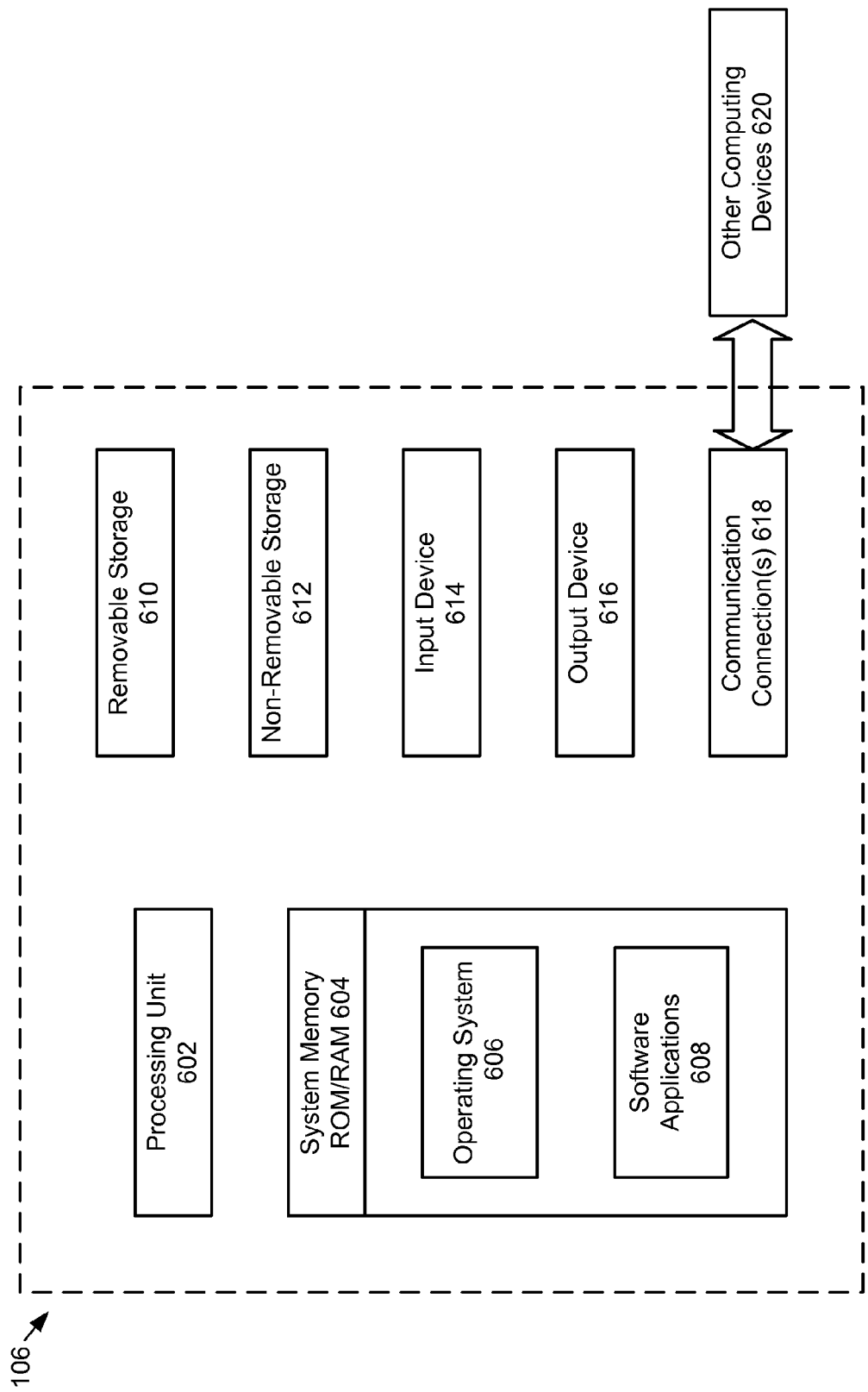

CONTEXTUAL RELEVANCE ENGINE FOR ACTIVITY FEEDS

BACKGROUND

Activity feeds provide a means to alert users in a social network to activity in the social network. The information about the activity may originate from a variety of sources and may be associated with people, events, news items, work related items, etc. The activity feeds are formatted and displayed on a computing device, typically a client computer or a mobile telephone.

As a user's social network grows, the volume of received activity feeds also grows. Depending on the size of a user's social network, a user may be overwhelmed by activity feeds and may not easily be able to distinguish important activity feeds from unimportant activity feeds.

SUMMARY

Embodiments of the disclosure are directed to a method implemented on a computing device for determining relevance for activity feeds. Activity feeds are received from one or more business entities. Information is received regarding activities being performed by a user. Context information is received regarding the user. A user context is determined from the information the regarding activities being performed by the user and the context information. The user context indicates the current status of the user. A relevance of the activity feeds is determined based on the user context. At least some of the activity feeds are displayed on the computing device. At least some of the activity feeds are displayed according to a priority determined by the relevance.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 shows an example activity feeds user interface.

FIG. 6 shows example components of the server computer of FIG. 1.

DETAILED DESCRIPTION

The present application is directed to systems and methods for determining a contextual relevance for activity feeds. Activity feed information is displayed to a user on a computing device on the basis of a determined relevance of the activity feeds. Activity feeds that are determined to be of high relevance to the user are given a higher priority than activity feeds that are determined to be less relevant to the user. Accordingly, activity feeds that are determined to be of high relevance are displayed at or near the top of a display screen on the computing device and may also be highlighted by color or other means. In addition, the determination of contextual relevance reduces the chances that irrelevant activity feeds are displayed to the user.

An activity feed is a type of Internet or Intranet news feed in which structured information, typically XML-based, is provided. The activity feed provides information related to activities of individuals in a user's social network. In a business organization, the user's social network may include coworkers on a project team, individuals common to a product area, individuals in a specific part of an organization, for example product development, individuals in a specific professional area, etc. The individuals in a user's social network and the type of activities for which activity feeds are to be received are typically configurable by the user. When a change in a configured activity occurs, an activity feed documenting the activity is automatically sent to the user.

Activity feeds are received from a variety of sources including enterprise systems, enterprise stores and external systems. Relevance is determined for each incoming activity feed based on a context for the activity feed. The context for the activity feed is determined based on various parameters, such as current user activity, user preferences, configurable system parameters and environmental variables such as time of day and location.

Figure 1:
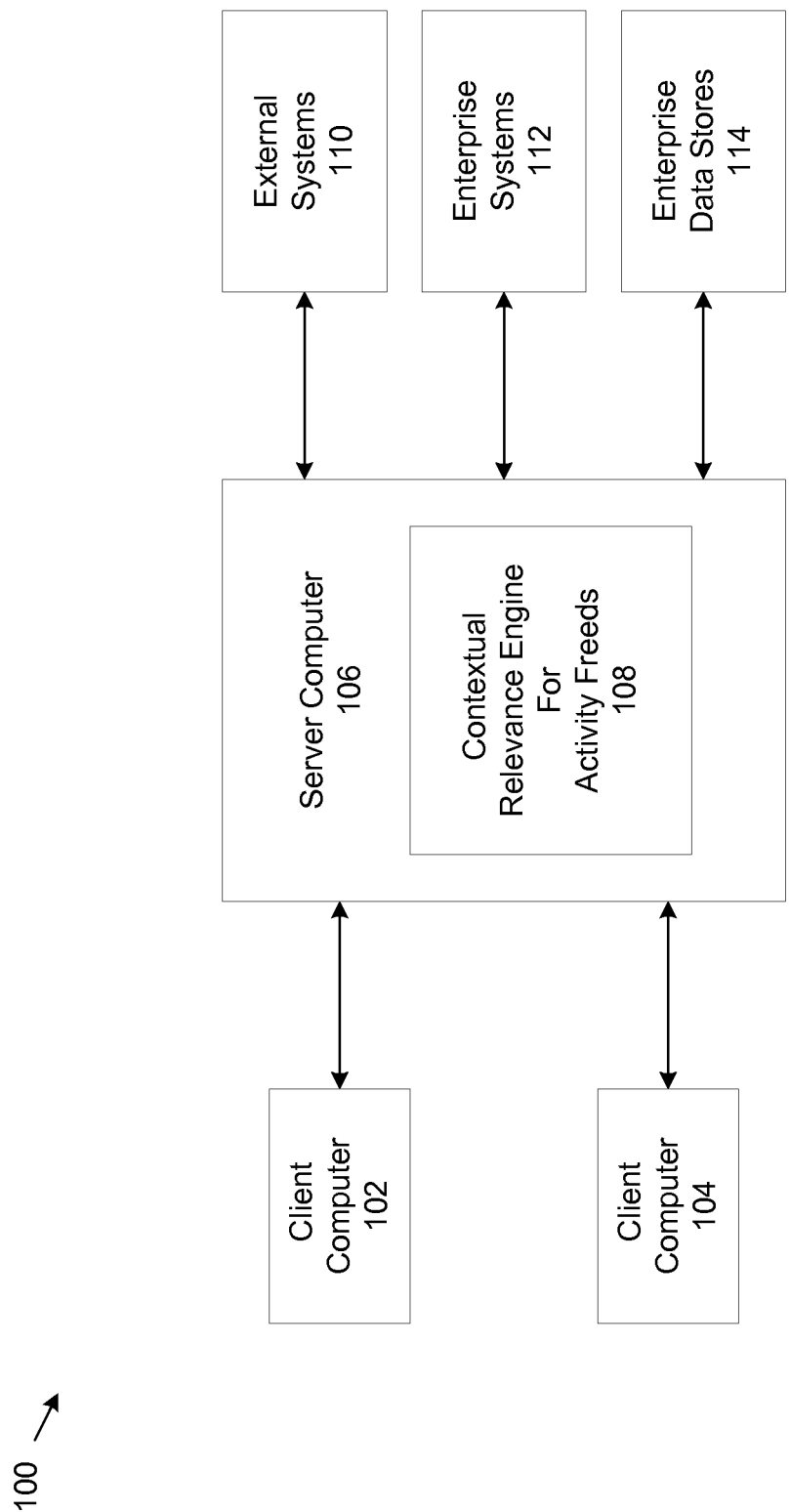
FIG. 1 shows an example system that supports a contextual relevance engine for activity feeds.

FIG. 1 shows an example system 100 that supports a contextual relevance engine for activity feeds. The example system 100 includes client computers 102, 104, server computer 106, external systems 110, enterprise systems 112 and enterprise data stores 114. The server computer 106 includes a contextual relevance engine for activity feeds 108.

The server computer 106 may be a server computer used for collaboration, file sharing and social networking. An example is a server computer that runs the Microsoft Sharepoint® Server 2010 software product from Microsoft Corporation of Redmond, Wash. Client computers 102, 104 may access server computer 106 over the Internet or via a corporate Intranet network.

External systems 110, enterprise systems 112 and enterprise data stores 114 may direct activity feeds to server computer 106. Enterprise systems 112 may include web sites within a business organization, such as human resources web sites or operational web sites. Other examples of enterprise systems 112 include email systems, database systems and customer relationship management systems. Examples of activity feeds that may originate from enterprise systems 112 are birthday notices, changes in job title, task status updates, changes made to a document, notifications of a sales order, etc. Other examples of activity feeds are possible.

Enterprise data stores 114 are data stores associated with the enterprise systems 112. External systems 110 may include web sites and data repositories external to the business organization. For example, one external system 110 may be a web site from a company that may be collaborating with the business organization, such as a supplier. The business organization may be interested in receiving activity feeds from this company and in turn, the company may be interested in receiving activity feeds from the business organization. Other examples of external systems 110 are possible.

The contextual relevance engine for activity feeds 108 is a module running on the server computer 106. In this example and as described further below, the contextual relevance engine for activity feeds 108 functions to aggregate a plurality of activity feeds, analyze the activity feeds, determine a relevance of the activity feeds, and deliver content from the activity feeds to end users in a manner so that higher important feeds are more easily identified to the end users.

For example, in the example system 100, the contextual relevance engine for activity feeds 108 collects and analyzes information from activity feeds generated by one or more of external systems 110, enterprise systems 112 and enterprise data stores 114. A user at client computers 102, 104 can thereupon request the user's activity feeds from the server computer 106. The contextual relevance engine for activity feeds 108 delivers information associated with the user's activity feeds to the client computers 102, 104 in a manner so that more important information is presented in a prominent manner.

Figure 2:
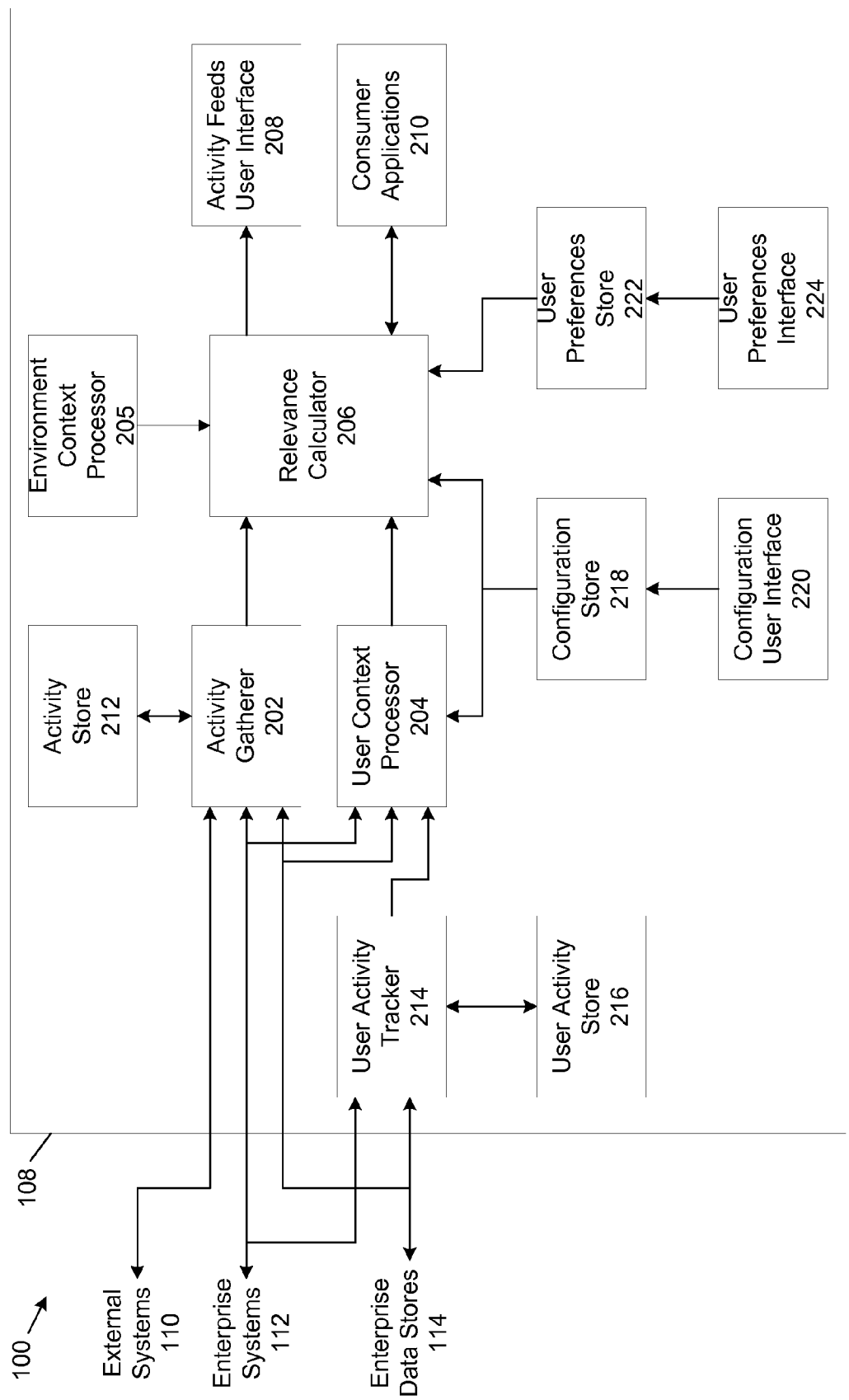
FIG. 2 shows example components of the contextual relevance engine of FIG. 1.

FIG. 2 shows example components of the contextual relevance engine for activity feeds 108. The example contextual relevance engine for activity feeds 108 includes an activity gatherer 202, an activity store 212, a user context processor 204, an environment context processor 205, a relevance calculator 206, an activity feeds user interface 208 and consumer applications 210. The contextual relevance engine for activity feeds 108 also includes a user activity tracker 214, a user activity store 216, a configuration user interface 220, a configuration store 218, a preferences user interface 224 and a user preferences store 222.

The example activity gatherer 202 listens for and receives activity feeds provided from one or more of the external systems 110, the enterprise systems 112 and the enterprise store 114. The activity gatherer 202 also monitors the external systems 110, the enterprise systems 112 and the enterprise store 114 for indications of change activity and records the change activity as activity feeds. In addition, the activity gatherer 202 crawls the enterprise systems 112 to build a searchable index that can be used by the relevance calculator 206. Other functionality of the activity gatherer 202 includes exposing application programming interfaces (APIs) for use by the external systems 110 and the enterprise systems 112. Change activity may be submitted to the activity gatherer 202 via the APIs. Other uses of the activity gatherer 202 are possible. The example activity store 212 stores the activity feeds received by the activity gatherer 202.

The example user activity tracker 214 monitors user activity to provide a context for received activity feeds. The user activity is recorded and stored in the example user activity store 216. Some examples of user activity include being on the telephone, in an instant messaging conversation, in a meeting, at a location, at home, on vacation, working on a specific task, updating status of a task, viewing a document, updating a document, sharing a document, etc. Other examples of user activity are possible.

The example configuration user interface 220 permits an enterprise administrator to configure policies related to activity feeds. These policies include setting access permissions for the activity gatherer 202, determining types of user activities monitored by the user activity tracker 214, determining how often the user context processor 204 and the environment context processor 205 are run and configuring the relevance calculator 206 to rank the relevance of specific activities. Other aspects of the configuration user interface 220 may include configuring privacy settings, configuring security settings, configuring how data is stored and configuring connection policies and access levels for the example enterprise systems 112. Other uses of the configuration user interface 220 are possible. The configuration settings from the configuration user interface 220 are stored in the configuration store 218.

The example preferences user interface 224 permits the user to personalize the types of activity feeds the user wishes to receive. The preferences user interface permits the user to configure data elements and fields related to activity feeds. In examples, the preferences user interface 224 may include a list of items from which a user can select. For example, a user may select one or more groups or individuals from which to receive activity feeds. The user may also be able to exclude one or more groups or individuals. The user may also be able to select groups or organizations from which to receive activity feeds and the user may also be able to select specific types of activity feeds to receive. For example, the user may decide to receive activity feeds relating to meeting updates but not receive activity feeds relating to birthday notices. The user preferences are stored in the user preferences store 222.

The example user context processor 204 determines a user context based on user activity. Some examples of user context are an upcoming meeting, relationship to meeting attendees, assigned projects and tasks, location status, for example in-the-office or out of-the office and location of the user if out-of-the office, etc. Other user contexts are possible.

The user context is determined from one of several sources. Example sources for determining user context include the user's calendar, projects and tasks assigned to the user, documents related to the user (for example documents created, authored or edited by the user), documents that may include the user's status, instant messaging activity, e-mail messages, information regarding the user's contacts within and without the business organization, an organizational profile of the user, the position of the user within the hierarchy of the business organization, information regarding the user's current location, information from enterprise data systems, for example from a human resources server, and current date and time. Other sources for determining user context are possible.

The user context may include a plurality of individual user contexts. For example, if the user context includes "upcoming meeting" and "projects", the user contexts of "upcoming meeting" and "projects" may be included in a data structure such as an array. In this example, each row of the array may include a string of characters corresponding to the individual user context. In other examples, each specific user context may correspond to an entry in a bitmask that represents overall user context. Other examples of representing and storing user context are possible.

The example environment context processor 205 determines an environment context for current environmental variables such as user location, GPS position, outside temperature, date and time of day. Other environmental variables are possible. The determination of environmental context may be represented as a data structure such as an array having a separate row for each environmental variable, a string that concatenates one or more environmental variables, a linked list, etc. Other means for representing environmental context are possible.

The relevance calculator 206 receives inputs from the activity gatherer 202, the user context processor 204, the environment context processor 205, the configuration store 218 and the user preferences store 222. Based on these inputs the relevance calculator 206 ranks each activity feed received by the activity gatherer 202 and calculates a relevance score for each activity feed.

When determining a relevance score, the relevance calculator may first classify activity feeds according to an activity type, with some activity types being ranked higher than others. For example, an activity feed related to business function, for example indicating that a document has been updated or that a project task has been created or updated, may be ranked higher than an activity feed related to a social event such as alerting the user about a coworker's birthday.

The relevance calculator 206 also evaluates the user preferences from the user preference store 222. The evaluation of the user preferences may determine whether a specific activity feed is relevant to the user. For example, if the activity is an announcement of a birthday and the user preference is not to be notified about birthdays, the activity feed is not displayed to the user.

When it is determined than an activity feed is relevant to the user based on the user preferences, a determination of relevance is made based on the user context. The determination of relevance based on the user context ranks the activity feed according to importance. For example, when the user context is that the user is scheduled for a meeting in 15 minutes and that coworkers A, B and C are also scheduled to attend the meeting, when it is determined from incoming activity feeds that coworker A modified a document and it is determined from the user context that the document is embedded in the notice for the meeting, the activity feed indicating that coworker A modified the document would receive a high ranking. In examples, the activity feed indicating that coworker A modified the document is displayed near or at the top of the activity feeds user interface 208. In addition, the activity feed indicating that coworker A modified the document may be highlighted and prominently displayed to the user.

In examples, activity feeds may be ranked on a scale from 1 to 10, where 10 corresponds to a highest ranking. In other examples different scales, for example 1 to 100, may be used. The ranking that an activity feed receives corresponds to the calculated relevance for the activity feed.

When the relevance calculator 206 makes a determination of relevance for an activity feed, the activity feed is displayed the user via the activity feeds user interface 208. Activity feeds may be displayed as a series of messages and may also include hyperlinks, graphics and time stamps. Activity feeds are displayed according to the determined relevance. Typically, activity feeds with a high relevance are displayed at or near a top of the activity feeds user interface 208. An example of an activity feed display is discussed later herein.

In addition to providing activity feeds for display on the activity feeds user interface 208, the relevance calculator 206 may send activity feeds to one or more consumer applications 210. The consumer applications 210 are typically computer applications that run on consumer devices or interfaces for which activity feed information is desired. Examples of such consumer devices or interfaces include a desktop browser, a mobile phone, a tablet computer, a personal computer, a mobile browser and a tablet browser. Other examples are possible. The relevance calculator 206 provides APIs for the consumer application 210 to submit requests for activity feeds. The most contextually relevant activity feeds are then sent to the consumer applications 210 via APIs exposed on the consumer applications 210.

Figure 3:
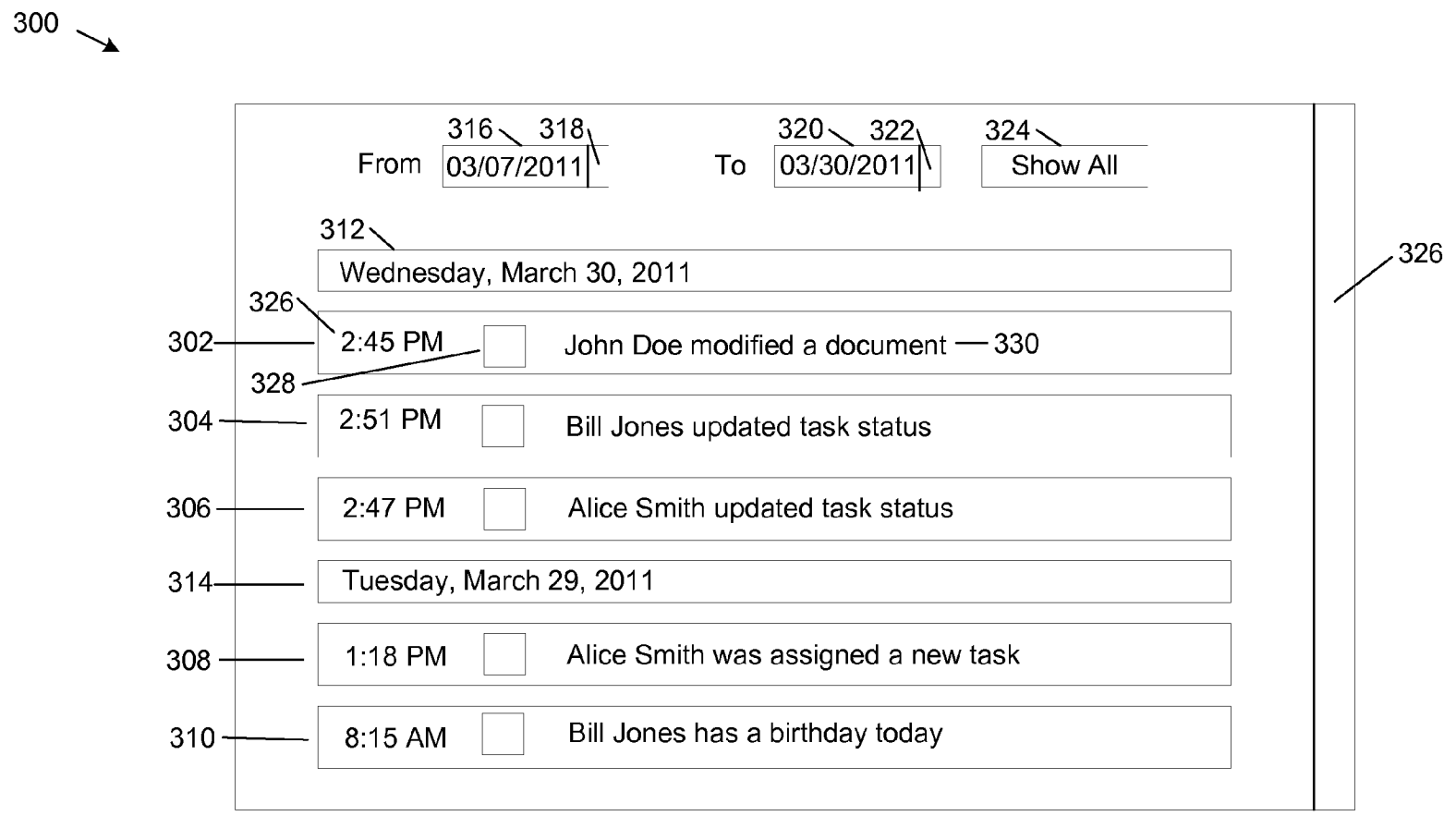

FIG. 3 is an example activity feeds display screen 300 that is part of the example activity feeds user interface 208. The example activity feeds display screen 300 organizes the display of activity feeds for a user by date and time. However, as discussed later, activity feeds with a high relevance may be displayed at or near the top of the activity display screen 300, irrespective of the date and time.

The activity feeds display screen 300 includes a "from" date field 316, a "to" date field 320 and a "show all" field 326. The "from" date field 316 permits a user to enter a beginning date for which to display activity feeds for the user. A beginning date can be entered directly into the "from" date field 316 or by selecting a date from a calendar. The calendar is displayed when the example calendar field 318 is selected. Similarly, the "to" date field 320 permits a user to enter an end date for which to display activity feeds for the user. A calendar is displayed when the example calendar field 322 is selected. When the "show all" button 324 is clicked, all activity feeds for the user are displayed.

For the example shown in FIG. 3, five activity feeds (activity feeds 302, 304, 306, 308 and 310) are displayed. In this example, the activity feeds are grouped by date. For example, activity feeds 302, 304 and 306 are grouped under Wednesday, Mar. 30, 2011 and activity feeds 308 and 310 are grouped under Tuesday, Mar. 29, 2011. In this example date headers 312, 314 identify the day and date.

For the example shown in FIG. 3, each activity feed displayed includes a time stamp, a priority icon, and a message description. For example, activity feed 302 includes timestamp 326, priority icon 328 and message description 330. The example timestamp 326 indicates the time at which the activity feed 302 was received. The example priority icon 328 displays an icon that may indicate a priority for the activity feed 302. For example, an important activity feed may be indicated by a color, for example red, or may be indicated by an exclamation point or some other symbol. The message description 330 describes the activity feed. In examples, other items can be displayed with the activity feeds, including graphics and hyperlinks. In addition, a scroll bar 326 is provided for viewing activity links that scroll of the display screen 300.

For the example shown in FIG. 3, activity feeds of high relevance are displayed at or near the top of the activity display screen 300. For example, activity feeds 302, 304 and 306 are all shown as being received on Wednesday, Mar. 30, 2011. Activity feeds 304 and 306 are ordered by the time that the activity feeds are received. Because activity feed 304 was received more recently than activity feed 306, activity feed 304 is displayed above activity feed 306. However, for this example, activity feed 302 has a higher relevance to the user than either activity feed 304 or activity feed 306. Because activity feed 302 has a higher relevance to the user than activity feeds 304 and 306, activity feed 302 is displayed above both activity feeds 304 and 306. Activity feed 302 is displayed above both activity feeds 304 and 306 even though activity feed 302 was received earlier than activity feeds 304 and 306. Activity feed 302 is displayed near the top of activity display screen 300 because activity feed 302 is determined to have a higher relevance to the user than activity feeds 304 and 306.

Figure 4:
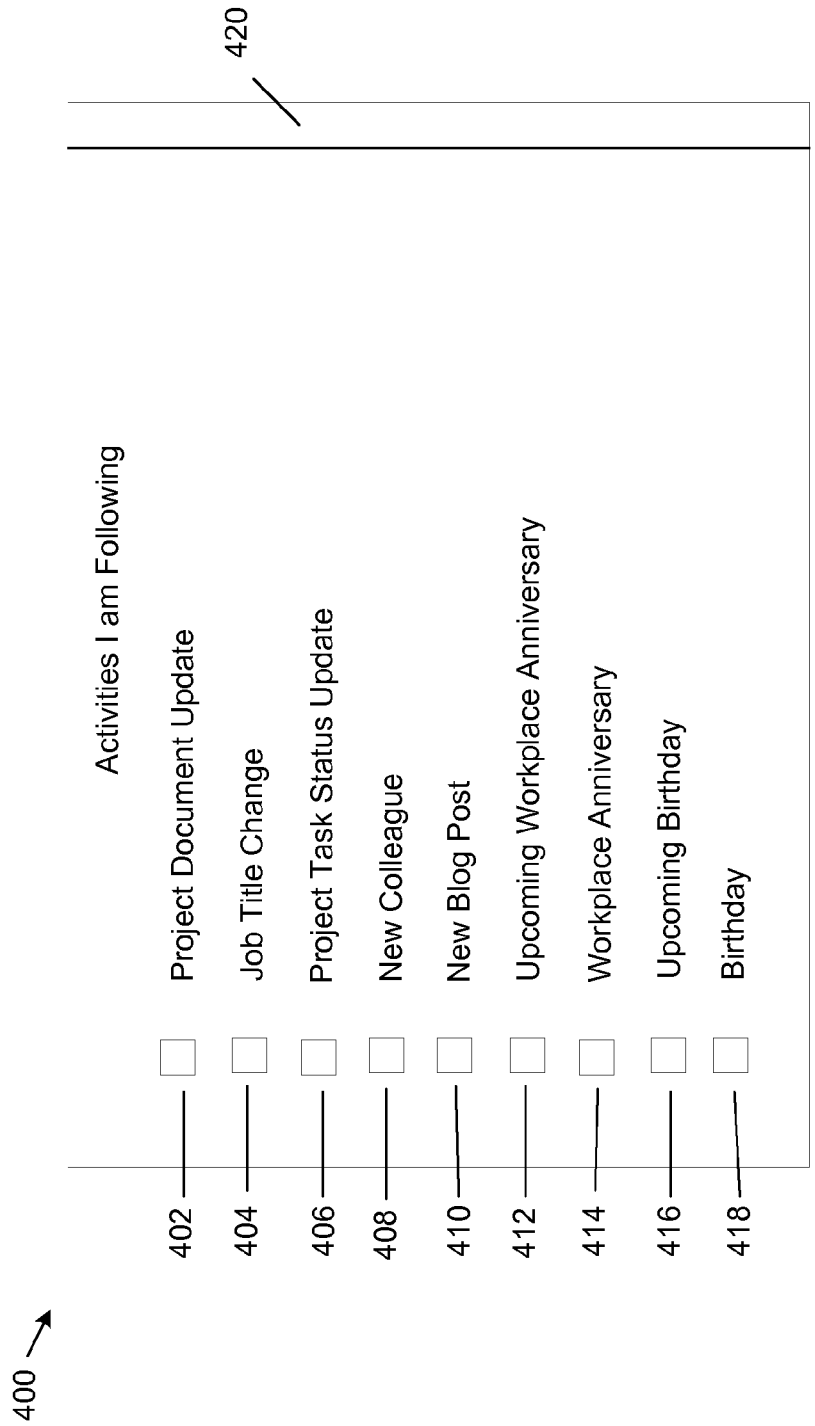
FIG. 4 shows an example preferences user interface.

FIG. 4 is an example preferences user interface 400. The preferences user interface 400 permits a user to select one or more activities of interest for which activity feeds should be displayed for the user. The preferences user interface 400 includes checkboxes 402-418, each corresponding to a specific activity. For example, when checkbox 402 is checked, the user receives an activity feed whenever a project document is updated. Similarly, when checkbox 406 is checked, the user receives an activity feed whenever someone on a specific project updates status for a project task. The activities of interest shown in FIG. 4 are examples only. More or fewer activities may be included. The preferences user interface 400 also includes a scroll bar 420 when more activities of interest than fit on the size of a display screen are provided.

Figure 5:
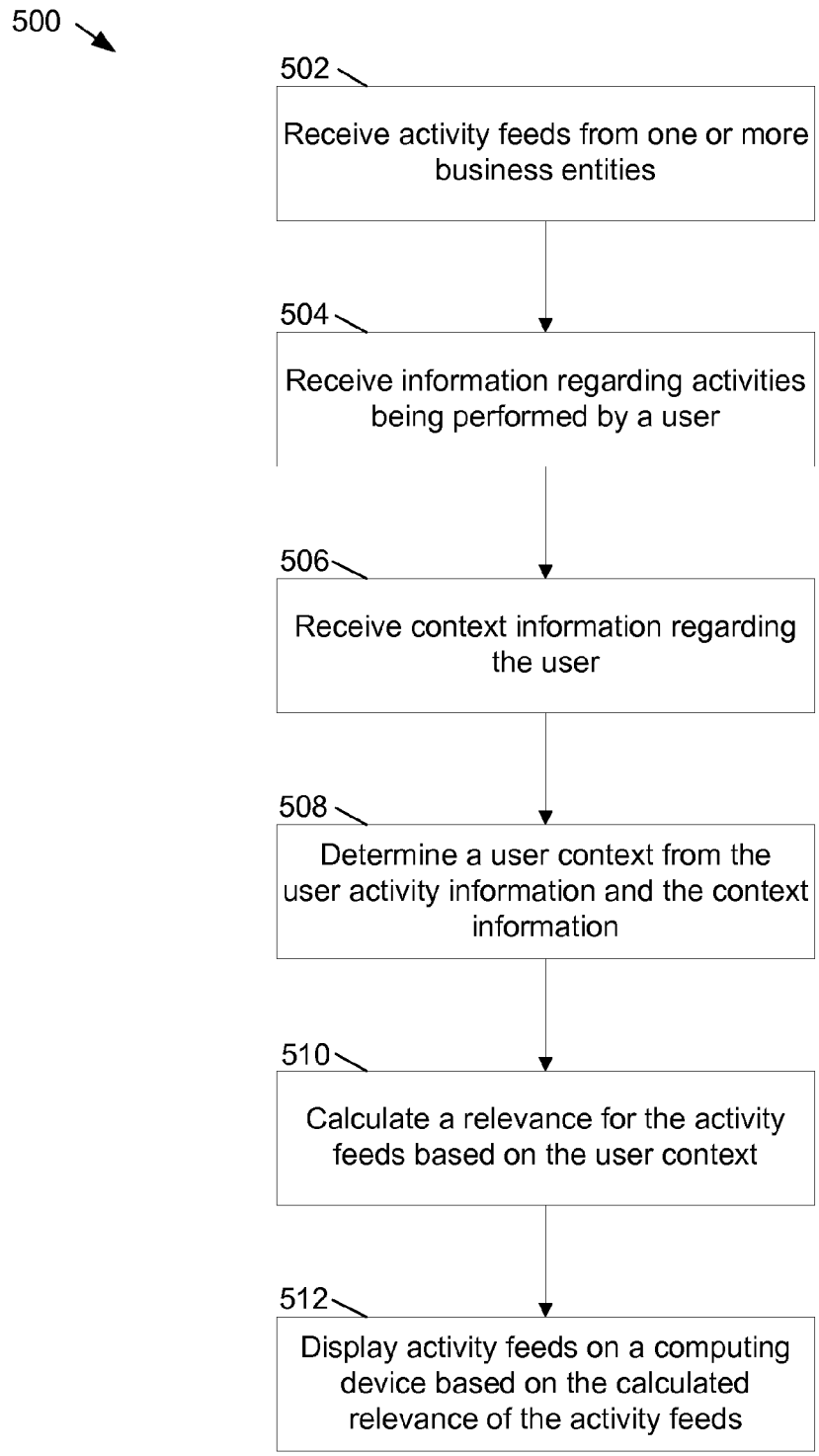
FIG. 5 shows an example flowchart for estimating relevance for activity feeds.

FIG. 5 shows an example flowchart of a method 500 for determining relevance for activity feeds. At operation 502, activity feeds from one or more business entities are received. The business entities may include enterprise systems, enterprise stores and external systems, for example enterprise systems 112, enterprise data stores 114 and external systems 110. An example enterprise system is a human resources server for a business organization. Another example enterprise system is an email server for the business organization. An example external system is a web site external to the business organization.

The activity feeds are typically received in either a pull or push scenario. In a pull scenario, the example server computer 106 monitors, listens for and records change activity in the one or more enterprise systems or enterprise stores, typically by periodically polling the one or more enterprise systems or enterprise stores. When such change activity is detected, activity feeds corresponding to the change activity are received at server computer 106. In a push scenario, server computer 106 listens for and accepts activity feeds from the one or business entities when the one or more business entities detect change activity and send corresponding activity feeds to server computer 106. When an external system sends an activity feed to server computer 106, the external system typically makes use of APIs exposed by server computer 106. At operation 504, information is received regarding activities being performed by a user. The information is received by a user activity tracker, for example user activity tracker 214, on server computer 106. The user activity tracker 214 records and stores user activity in order to provide a user context for the received activity feeds. Examples of user activity are updating a document, updating project task status, being in a meeting, etc.

At operation 506, context information is obtained regarding the user from one or more sources. The one or more sources include an events calendar for the user, tasks and projects assigned to the user, documents relating to a project or task for the user, email and instant messaging activity for the user, user contacts, an organizational hierarchy for the business organization, a user profile, information from enterprise systems (for example from a human resources system), location information for the user and current date and time. Other sources for obtaining context information regarding the user are possible.

At operation 508, a user context is determined from the obtained information regarding user activity and the context information regarding the user. For example, when it is determined from the user's calendar that a meeting for a user is scheduled in the near future, for example later in the day, the next day, etc., an example user context may be "upcoming meeting." Similarly, when it is determined from a list of projects that the user is assigned to one or more specific projects, the user context may include "projects" and may further include an association (for example a link or a pointer) to the one or more specific projects assigned to the user.

At operation 510, a relevance score is calculated for the activity feeds based on the user context. The relevance is typically calculated by a relevance calculator module, for example relevance calculator 206. The relevance calculator calculates a ranking score for each activity feed based on the user context. Activity feeds having a high relevance score receive priority when displayed on the activity feeds user interface. Typically, activity feeds with high relevance scores are displayed at or near the top of the activity feeds user interface. In examples, activity feeds with high ranking scores may be displayed with a bright color, such as red, or displayed in bold lettering or with an icon indicating urgency. Other methods of highlighting high ranking activity feeds are possible.

The relevance calculator calculates the relevance score for an activity feed by evaluating the activity feed with respect to the user context. For example if the activity feed indicates that a project document has been updated and the user context indicates that the user will be attending a meeting at which the document will be discussed, the relevance calculator will rank the activity feed very high and prioritize the activity feed over other activity feeds. However, for the same activity feed, if the user context does not indicate the user will be attending an upcoming meeting at which the document will be discussed, the activity feed will receive a lower relevance score and a lower ranking. For this case, the display of the activity feed generally will not be prioritized and the activity feed will typically be displayed in the order in which it is received for similar types of activity feeds.

The relevance calculator may maintain a ranking of activities independently of user context. For example a document update or a task status change may receive a higher priority than an activity feed for a birthday notification.

At operation 512, the activity feeds are displayed on the activity feeds user interface of the computing device. The activity feeds are displayed based on the calculated relevance of the activity feeds. Typically, activity feeds with higher rankings are displayed at or near the top of the activity feeds user interface. Lower ranked activity feeds are typically displayed in an order determined by the time and date in which the activity feeds are displayed. Activity feeds of higher ranked classifications (for example document updates as opposed to birthday notices) are typically displayed closer to the top of the activity feeds user interface than activity feeds of lower ranked classifications.

With reference to FIG. 6, example components of server computer 106 are shown. In example embodiments, server computer 106 is a computing device. Server computer 106 can include input/output devices, a central processing unit ("CPU"), a data storage device, and a network device.

In a basic configuration, server computer 106 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a server, such as the Microsoft Sharepoint® Server 2010 server computer, from Microsoft Corporation of Redmond, Wash. The system memory 604 may also include one or more software applications 608 and may include program data.

The server computer 106 may have additional features or functionality. For example, server computer 106 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 6 by removable storage 610 and non-removable storage 612. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 106. Any such computer readable storage media may be part of server computer 106. Server computer 106 may also have input device(s) 614 such as keyboard, mouse, pen, voice input device, touch input device, etc. Output device(s) 616 such as a display, speakers, printer, etc. may also be included.

The server computer 106 may also contain communication connections 618 that allow the device to communicate with other computing devices 620, such as over a network in a distributed computing environment, for example, an intranet or the Internet. Communication connections 618 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method implemented on a computing device for determining relevance for activity feeds, the method comprising:
   aggregating activity feeds received from a plurality of external systems, enterprise systems, and enterprise data stores without user input, wherein the activity feeds include at least one of information regarding activities performed by a user, activities performed by members of a social network of the user, user context information, or environmental information, the aggregating of the activity feeds comprising:
   monitoring, listening to and recording change activity from the plurality of enterprise systems,
   accepting change activity information provided by the plurality of enterprise systems, and
   building a search index by crawling the plurality of enterprise systems; and
   gathering the information regarding the activities performed by the user from the aggregated activity feeds;
   gathering the user context information from the aggregated activity feeds;
   gathering the environmental information from the aggregated activity feeds;
   determining a user context from the user context information and the activities, the user context indicating a current status of the user;
   determining an environmental context from the environmental information;
   determining a ranking of the activity feeds based on the user context, the environmental context, and type of each activity feed;
   calculating a relevance score for each of the activity feeds based on the ranking;
   maintaining the ranking of the activity feeds independently of the user context;
   determining a relevance of the activity feeds based on the ranking and the relevance score; and
   displaying at least some of the activity feeds on the computing device according to a priority determined by the relevance.

2. The method of claim 1, wherein aggregating the activity feeds further comprises monitoring, listening to and recording change activity from the plurality of enterprise systems.

3. The method of claim 1, wherein aggregating the activity feeds further comprises accepting change activity information provided by the plurality of enterprise systems.

4. The method of claim 1, wherein the plurality of external systems comprises one or more web sites external to the plurality of enterprise systems.

5. The method of claim 1, further comprising receiving one or more categories of activity information identified as being of interest to the user.

6. The method of claim 5, wherein the calculation of the relevance is further based on the one or more categories of activity information identified as being of interest to the user.

7. The method of claim 1, wherein aggregating the activity feeds further comprises building a search index by crawling the one or more of the business entities.

8. The method of claim 1, wherein aggregating the activity feeds further comprises exposing one or more application programming interfaces through which change activity data is submitted.

9. The method of claim 1, wherein gathering the information regarding the activities performed by the user further comprises obtaining information from one or more of a calendar, an email system, a document system and an enterprise data system.

10. The method of claim 1, further comprising receiving and implementing configuration information regarding when user activity is tracked, when activity information is gathered, when the user context is determined and when the relevance is calculated.

11. The method of claim 1, further comprising providing one or more application programming interfaces for receiving requests from one or more applications for contextually relevant activity feeds.

12. The method of claim 1, wherein the environmental information includes time of day and location.

13. A server computer comprising:
   a processing unit; and
   system memory, the system memory including instructions that, when executed by the processing unit, cause the server computer to:
   aggregate activity feeds received from a plurality of external systems, enterprise systems, and enterprise data stores without user input, wherein the activity feeds include at least one of information regarding activities performed by a user, activities performed by member of a social network of the user, user context information, or environmental information, the aggregating of the activity feeds comprising:
   monitoring, listening to and recording change activity from the plurality of enterprise systems;
   accepting change activity information provided by the plurality of enterprise systems; and
   building a search index by crawling the plurality of enterprise systems;

gather the information regarding the activities performed by the user from the aggregated activity feeds;

gather the user context information from the aggregated activity feeds;

gather the environmental information from the activity feeds;

determine a user context from the gathered information regarding the activities performed by the user and the user context information, the user context indicating a current status of the user;

determine an environmental context from the environmental information;

determine a ranking of the activity feeds based on the user context, the environmental context, and type of each activity feed;

maintain the ranking of the activity feeds independently of the user context;

calculate a relevance of the activity feeds by calculating a relevance score for each of the activity feeds based on the ranking; and display at least some of the activity feeds on a computing device according to a priority determined by the calculated relevance.

14. The server computer of claim 13, wherein the instructions further cause the server computer to provide one or more application programming interfaces for receiving requests from one or more applications for contextually relevant activity feeds.

15. The server computer of claim 13, wherein the instructions further cause the server computer to expose one or more application programming interfaces through which change activity data may be submitted.

16. The server computer of claim 13, wherein the environmental information includes GPS position, outside temperature and date.

17. A computer readable storage medium comprising instructions that, when executed by a server computer, cause the server computer to:

aggregate activity feeds received from a plurality of external systems, enterprise systems, and enterprise data stores without user input, wherein the activity feeds include information regarding activities performed by a user, user context information, and environmental information, the aggregate of the activity feeds comprising:

monitoring, listening to and recording change activity from the plurality of enterprise systems, accepting change activity information provided by the plurality of enterprise systems, and building a search index by crawling the plurality of enterprise systems;

gather information regarding the activities performed by the user from the aggregated activity feeds;

determine a user context from the information regarding the activities performed by the user, the user context indicating a current status of the user;

determine a ranking of the activity feeds based on the user context, an environmental context, and type of each activity feed;

maintain the ranking of the activity feeds independently of the user context;

calculate a relevance of the activity feeds by calculating a relevance score for each of the activity feeds based on the ranking; and display at least some of the activity feeds on a computing device according to a priority determined by the calculated relevance.

18. The method of claim 1, further comprising:

receiving user preferences, and wherein determine the ranking of the activity feeds is further based on the user preferences.

19. The method of claim 18, further comprising:

providing selectable activities of interest on a preferences user interface, and wherein the user preferences are received from a selection by the user of the selectable activities of interest on the preferences user interface.

20. The method of claim 1, wherein the plurality of enterprise systems comprise business organization e-mail systems, business organization database systems and web sites within a business organization.

* * * * *